US006550394B1

United States Patent
Polley

(12) United States Patent
(10) Patent No.: US 6,550,394 B1
(45) Date of Patent: Apr. 22, 2003

(54) RETRACTABLE AUXILIARY BUMPER FOR HYDRAULIC OR PNEUMATIC RAILWAY SUSPENSIONS

(75) Inventor: Richard B. Polley, Gahanna, OH (US)

(73) Assignee: Buckeye Steel Castings Company, Columbus, OH (US)

( * ) Notice: Subject to any disclaimer, the term of this patent is extended or adjusted under 35 U.S.C. 154(b) by 0 days.

(21) Appl. No.: 10/095,230

(22) Filed: Mar. 11, 2002

(51) Int. Cl.⁷ .................................................. B61F 13/00
(52) U.S. Cl. .................. 105/164; 105/198.1; 105/198.3
(58) Field of Search .................... 105/198.1, 199.1, 105/199.2, 198.3, 453, 164, 210; 280/5.515

(56) References Cited

U.S. PATENT DOCUMENTS

| 3,701,397 A | * 10/1972 | Shirane et al. ............... 105/164 |
| 3,861,696 A | * 1/1975 | Gustafsson ............... 280/5.515 |
| 3,868,910 A | * 3/1975 | Schultz ........................ 105/164 |
| 3,918,369 A | * 11/1975 | Kitaoka et al. ............. 105/164 |
| 4,245,563 A | * 1/1981 | Empson .................... 105/198.3 |
| 4,976,454 A | * 12/1990 | Bohn ........................ 105/453 |
| 5,947,031 A | 9/1999 | Polley |

* cited by examiner

Primary Examiner—S. Joseph Morano
Assistant Examiner—Lars A. Olson
(74) Attorney, Agent, or Firm—Banner & Witcoff, Ltd.

(57) ABSTRACT

An auxiliary suspension for hydraulic or pneumatic railway car suspensions is disclosed. The auxiliary suspension includes a bumper assembly which is located below the railcar body. The bumper assembly further includes a bumper pad that is retracted when a certain level of pressure is present in the hydraulic or pneumatic suspension. In a retracted position, the passenger car has room to "kneel" at a station platform to align the car floor height with the station platform height. When pressure in the hydraulic or pneumatic suspension is absent, the bumper pad of the auxiliary suspension extends to allow safe operation of the passenger train.

19 Claims, 2 Drawing Sheets

RETRACTABLE AUXILIARY BUMPER FOR HYDRAULIC OR PNEUMATIC RAILWAY SUSPENSIONS

FIELD OF THE INVENTION

The present invention relates in general to railway car suspensions. More particularly, the present invention relates to retractable auxiliary bumpers for railway car suspensions.

BACKGROUND OF THE INVENTION

It is known that passenger railway cars use a pneumatic or hydraulic spring suspension to absorb the track shocks and vibrations of the railway trucks so as to provide a safe and comfortable transit for the train passengers. It is also known that the pneumatic or hydraulic spring suspension uses a leveling device to regulate the height of the railway car. U.S. Pat. No. 5,947,031, issued to Polley, describes the use of leveling valves to regulate the height of the railway car and is incorporated herein by reference. These suspensions and leveling devices maintain an essentially constant railway car floor height relative to the railroad track and relative to the height of a station platform. These devices attempt to maintain this constant floor height over an entire load range, that is, from an empty railway car to a full car. A constant railway floor height facilitates safer loading and unloading of passengers, especially disabled persons.

On some existing transit systems, however, the station platforms are positioned below the railway car floor level so that passengers have to step up to board the train or step down to disembark. This uneven height between the railway car floor and the station platform has caused difficulties to passengers, especially ones who are disabled. In an effort to overcome this problem, passenger railway cars have been lowered to align the car floor with the station platform height. With many existing passenger trains, however, it is impractical to lower the railway car floor to the station platform height and still maintain an acceptable dynamic ride quality. The other option of raising the station platforms can be cost prohibitive, especially on older transit systems.

Another effort has been the incorporation into the railway car of a "kneeling" operation. With the use of a kneeling operation, the railway car operates dynamically along the railroad track at the upper spring suspension height to provide adequate ride quality and "kneels" to the platform height upon stopping in the station and prior to opening the car doors. The procedure for "kneeling" can be briefly summarized as follows. Upon arriving to a complete stop at the station, a sensor on the railway car gauges the station platform height and adjusts the pneumatic or hydraulic spring height by expelling fluid to conform the railway car floor height to the height of the station platform. Prior to leaving the station, and after the doors close, the "kneeling" procedure is reversed and the railway car is again raised to operating height.

Problems with "kneeling" the railway car occur when the kneeling operation is restricted by the auxiliary suspension mounted to each passenger train. It is commonplace for pneumatic or hydraulic spring suspension systems to include an auxiliary suspension, such as a resilient bumper, to provide safe operation of the passenger train should the pneumatic or hydraulic spring suspension system lose pressure. This auxiliary suspension is located below the car body kneeling position and requires additional deflection beyond the kneeling deflection. Problems arise when the reserve between maximum kneeling deflection and the deflection limit for safe operation is small. With inoperative fluid pressure this can result in excessive suspension deflection so that dynamic clearance limits for safe operation are violated.

BRIEF SUMMARY OF THE INVENTION

The present invention solves the problems known and experienced in the art with respect to passenger cars that "kneel" by providing an auxiliary suspension, such as a bumper device, which is depressed below the lowest "kneeling" position. In this position, no bumper contact occurs while there is sufficient hydraulic or pneumatic spring pressure to support the car at either operating or "kneeling" position. Upon the loss of hydraulic or pneumatic pressure, the auxiliary bumper rises to meet the car body structure and support the car at a level for safe operation. When the pressure is restored to the hydraulic or pneumatic suspensions, the auxiliary bumper retracts to its original position. Significantly, the auxiliary bumper of the present invention does not interfere with normal railcar operation or "kneeling" at a station as long as hydraulic or pneumatic pressure is available to the suspension. In addition, the auxiliary bumper supports the railway car at or above the kneeling height thus providing safe operation when suspension pressure is absent.

In an exemplary embodiment, the present invention includes an auxiliary suspension assembly for a railway truck that is operatively connected to the pressurized spring suspension mounted to the railway truck. The auxiliary suspension includes a bumper assembly that further includes a pressurized cylinder, a spool mounted within the cylinder, a spool spring mounted below the spool and within the cylinder, and a resilient bumper pad mounted above the spool. The spool is slidably mounted within the cylinder. A first fluid supply line connects to the spring suspension and a second fluid supply line is mounted in fluid communication with the first supply line. The second supply line also connects to the pressurized cylinder. When there is a change in fluid pressure to the spring suspension in the first supply line there is a change in pressure in the second supply line and cylinder. This change in pressure causes or permits slidable movement of the spool and accompanying bumper pad within the cylinder. This slidable movement effects extension or retraction of the bumper pad relative to the car body.

DETAILED DESCRIPTION OF THE INVENTION

Referring to the Figures, wherein like numerals indicate like elements, there is depicted various embodiments of an auxiliary suspension assembly for a railcar truck. The depicted embodiments include the use of a bumper assembly having a resilient bumper pad, which may retract when pressure in the railcar truck suspension is present and may extend when pressure in the suspension is absent to provide safe transit of the passenger train.

Figure 1:
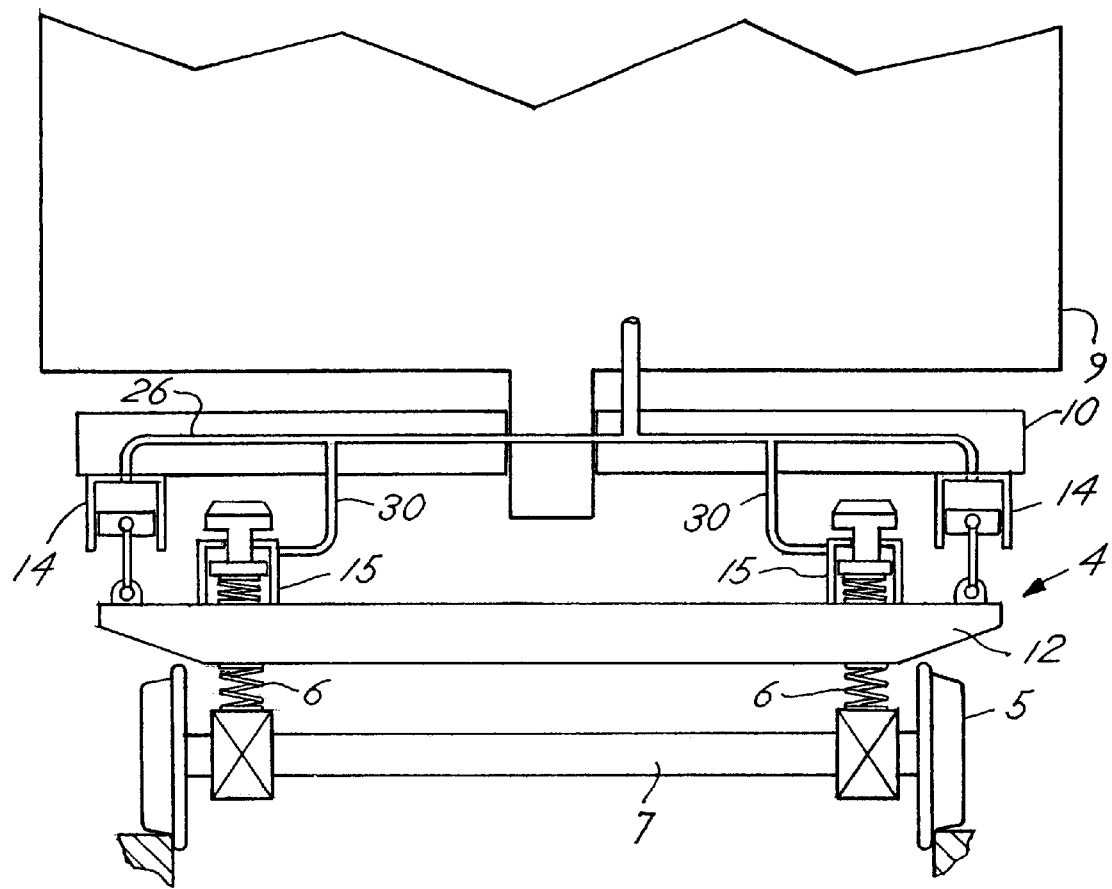
FIG. 1 shows an elevation view of a railcar incorporating the auxiliary suspension assembly of the present invention.

Referring to FIG. 1, the railcar truck 4 is the wheeled structure that supports the railcar body and rides along the railroad track. Each railcar truck includes a truck bolster 10 and a truck frame 12. The truck frame supports the bolster through a suspension system. The truck frame rides on at least two wheelsets 5, which ride along the railroad track. The truck frame and truck bolster are suspended on the wheelsets by a primary suspension 6. As will be understood by those skilled in the art, the primary suspension typically comprises elastomeric or steel springs located adjacent to the ends of each wheel axle 7 of each wheelset 5 and positioned between the axle and the truck frame. The primary suspension 6 provides wheel load equalization to allow the railcar to traverse uneven track.

As conventional, a railcar body 9 is pivotally positioned above the truck bolster and is supported by a secondary suspension 14. The secondary suspension 14 in railcars, specifically in passenger railcars, typically includes an air spring or hydraulic spring positioned between each truck bolster end and the truck frame. The secondary suspension 14 not only supports the weight of the railcar body, but also provides for passenger ride comfort. The air or hydraulic springs of the secondary suspension for passenger railcars are controlled by a level regulating valve, not shown, which is connected to the spring. The level regulating valve is connected to the truck frame by a leveling valve linkage which senses the height of the air or hydraulic spring. The level regulating valve controls the fluid pressure in the air or hydraulic springs in accordance with the loading of the car body, such that, as the loading of the car body increases, the level regulating valve increases the spring pressure accordingly. Likewise, as the loading of the car body decreases, the fluid pressure in the air or hydraulic springs is decreased. This increase and decrease in fluid pressure keeps the floor of the car body at a relatively constant height above the railcar truck frame by maintaining a constant air or hydraulic spring height under varying static loading conditions.

Figure 2:
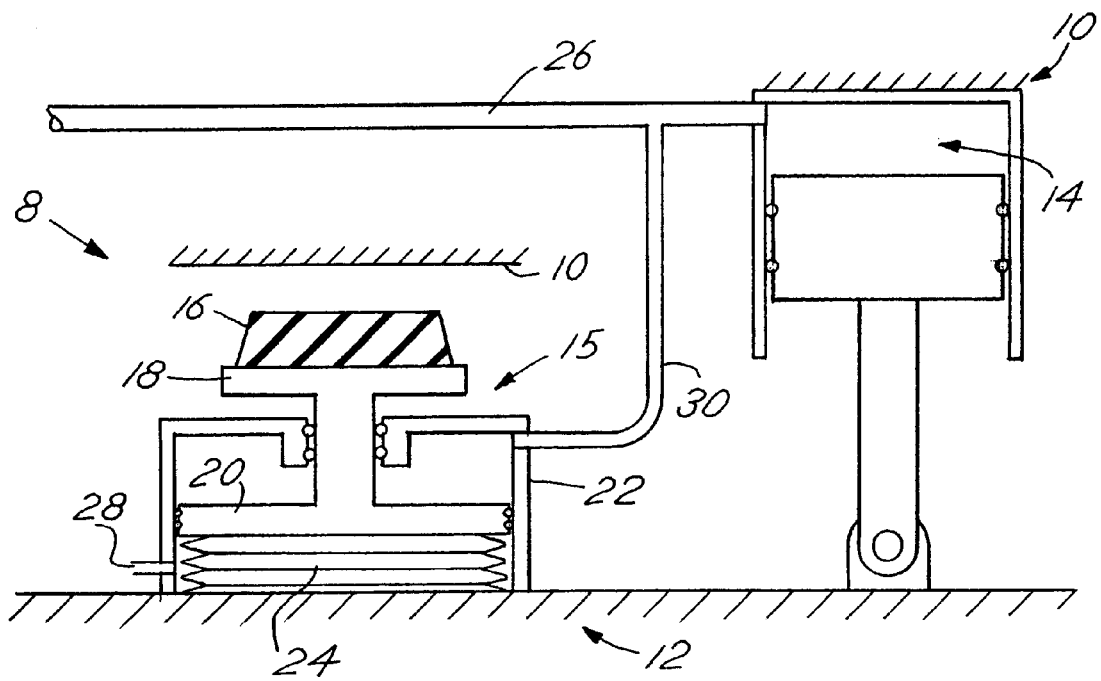
FIG. 2 shows an elevation view of the auxiliary suspension assembly of the present invention.

As depicted generally in FIG. 2, there is shown an auxiliary suspension assembly 8 of the present invention. As depicted, a sprung element 10, such as a truck bolster, is suspended above an unsprung truck element 12, such as a truck frame, by a hydraulic or pneumatic spring suspension 14, described above. The auxiliary suspension assembly 8 includes a bumper assembly 15 which further includes a bumper pad 16. The bumper pad might be an elastomeric pad, spring, or other resilient device, that is mounted on top of a spool 18, also called a shuttle spool. The spool 18 defines a lower piston 20 that is operatively mounted within a cylinder 22. As illustrated, the cylinder 22 is secured to the unsprung truck element 12. The lower chamber of the cylinder 22 includes a vent 28 and captures or encloses a spool spring 24, which exerts a spring force on the bottom of the spool. The upper chamber of the cylinder 22 is plumbed to a hydraulic or pneumatic supply line 26 through the use of a secondary supply line 30. The supply line 26 supplies pressurized fluid to the spring suspension 14. In the cylinder, the spool springs 24 are sized such that the springs are compressed by the hydraulic or pneumatic pressure in the upper cylinder chamber. As compressed, the springs permit the bumper pad 16 to retract away from the sprung truck element 10 and thus provide clearance for the railcar to kneel. When the pressure in spring element 14 falls below operating pressure range, the reduced pressure in the upper chamber of cylinder 22 is overcome by the spool spring 24 force which pushes the auxiliary bumper 16 upward and into contract with the sprung railcar element 10.

Figure 3:
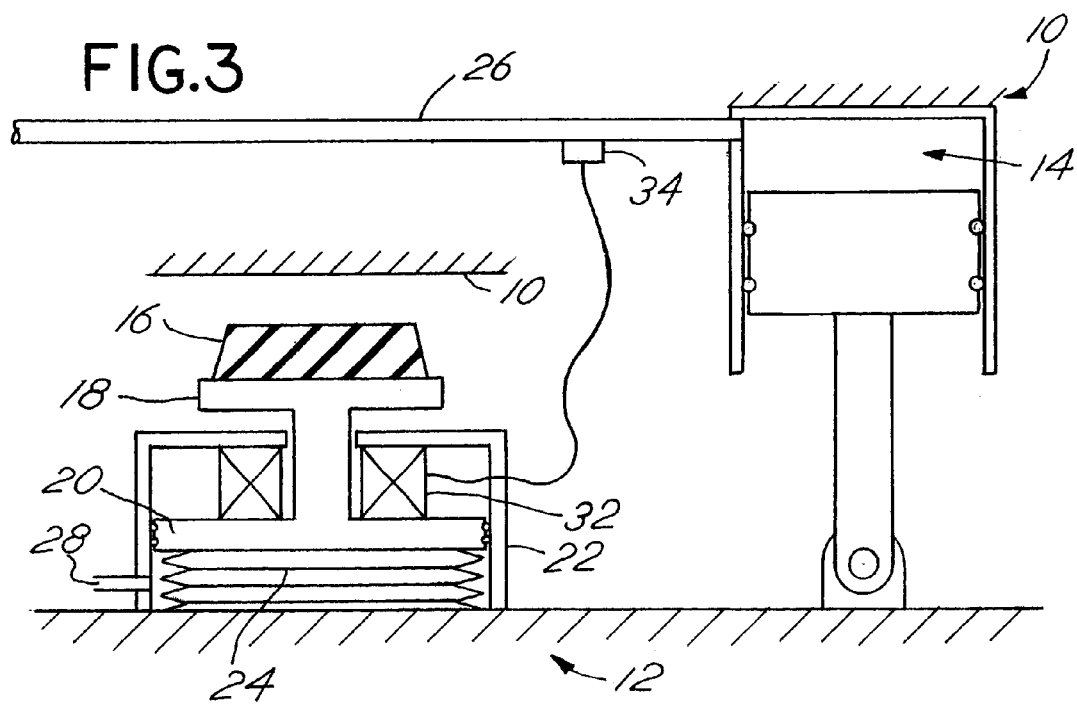
FIG. 3 shows an elevation view of an alternative arrangement of the invention of FIG. 2.

An alternative embodiment of the retractable auxiliary bumper assembly is shown in FIG. 3. Similar to the embodiment of FIG. 2, the sprung element 10 is suspended above the unsprung truck element 12 by the spring suspension 14. Connected to the spring element is the supply line 26 for providing pneumatic or hydraulic fluid pressure to the spring suspension 14. The bumper pad 16 is mounted on top of the spool 18, which defines the lower piston 20. The piston is operatively mounted within the cylinder 22, which is secured to the unsprung truck element 12. As above, the lower chamber of the cylinder 22 is vented to atmosphere at 28 and encloses the spool spring 24. Mounted within the upper chamber of the cylinder 22 is a solenoid valve 32 that controls the movement of the spool within the cylinder. As depicted, a pressure transducer 34 is mounted in the supply line 26 and sends an electrical signal to the solenoid valve 32 retracting the spool 18 and bumper 16. When the supply line pressure drops below a set value, the solenoid valve 32 de-activates and allows the spool spring 24 to push the bumper 16 upward toward the sprung truck element 10. When the supply line pressure is re-charged the pressure transducer sends a signal to re-energize the solenoid and reset the auxiliary bumper to the retracted position.

While the invention has been described with respect to specific examples including presently preferred modes of carrying out the invention, those skilled in the art will appreciate that there are numerous variations of the above described systems and techniques that fall within the spirit and scope of the invention as set forth in the appended claims.

What is claimed is:

1. An auxiliary suspension assembly for a railway truck having a spring suspension, the railway truck supporting a railcar body, the auxiliary suspension comprising:

a pressurized spring suspension element mounted to the railway truck, a first supply line containing pressurized fluid and connected to the spring suspension element, a bumper assembly mounted to the railway truck, the bumper assembly including a pressurized cylinder, a spool slidably mounted within the cylinder, a spool spring mounted below the spool and within the cylinder, a bumper pad mounted above the spool, and a second supply line in fluid communication with the first supply line, the second supply line connected to the cylinder, whereby a change in fluid pressure in the first supply line causes slidable movement of the spool and mounted bumper pad.

2. The auxiliary suspension assembly of claim 1 wherein the spring suspension element is a pneumatic spring element.

3. The auxiliary suspension assembly of claim 2 wherein the supply line provides pneumatic fluid to the spring suspension element.

4. The auxiliary suspension assembly of claim 1 wherein the spring suspension element is a hydraulic spring element.

5. The auxiliary suspension assembly of claim 4 wherein the supply line provides hydraulic fluid to the spring suspension element.

6. The auxiliary suspension assembly of claim 1 wherein the cylinder defines a bottom surface, the spool spring is mounted between the bottom surface of the cylinder and the spool.

7. The auxiliary suspension assembly of claim 1 wherein the bumper pad is a resilient spring.

8. The auxiliary suspension assembly of claim 1 wherein the cylinder includes a vent.

9. The auxiliary suspension assembly of claim 1 wherein the spool spring is sized to be compressed by the pressurized fluid in the cylinder.

10. The auxiliary suspension assembly of claim 1 wherein the truck defines a kneeling position, the bumper pad is depressed below the kneeling position by the fluid pressure in the first supply line and rises to support the railcar body at a level above the kneeling position when fluid pressure in the first supply line is absent.

11. An auxiliary suspension assembly for a railway truck having a spring suspension, the railway truck supporting a railcar body, the auxiliary suspension comprising:
   a pressurized spring suspension element mounted to the railway truck,
   a supply line containing pressurized fluid and connected to the spring suspension element,
   a transducer mounted within the supply line, and
   a bumper assembly mounted to the railway truck, the bumper assembly including a cylinder having a top wall and a bottom wall, a spool slidably mounted within the cylinder, a spool spring mounted between the spool and the bottom wall of the cylinder, a solenoid valve mounted within the cylinder and between the spool and the top wall of the cylinder, the solenoid valve electrically connected to the transducer, and a bumper pad mounted above the spool,
   whereby a change in fluid pressure in the supply line is detected by the transducer, which signals the solenoid valve to cause slidable movement of the spool and bumper pad.

12. The auxiliary suspension assembly of claim 11 wherein the spring suspension element is a pneumatic spring element.

13. The auxiliary suspension assembly of claim 12 wherein the supply line provides pneumatic fluid to the spring suspension element.

14. The auxiliary suspension assembly of claim 11 wherein the spring suspension element is a hydraulic spring element.

15. The auxiliary suspension assembly of claim 14 wherein the supply line provides hydraulic fluid to the spring suspension element.

16. The auxiliary suspension assembly of claim 11 wherein the bumper pad is a resilient spring.

17. The auxiliary suspension assembly of claim 11 wherein the cylinder includes a vent.

18. The auxiliary suspension assembly of claim 11 wherein the spool spring is sized to be compressed by the solenoid valve in the cylinder.

19. The auxiliary suspension assembly of claim 11 wherein the truck defines a kneeling position, the bumper pad is depressed below the kneeling position by the solenoid valve actuated by the fluid pressure in the first supply line and rises to support the railcar body at a level above the kneeling position when fluid pressure in the first supply line is absent.

* * * * *